Nov. 8, 1966 J. R. BERRY 3,284,637

SEMICONDUCTOR CHOPPERS

Filed July 16, 1962 3 Sheets-Sheet 1

INVENTOR
JON R. BERRY

BY Stevens Davis Miller & Mosher

ATTORNEYS

Nov. 8, 1966 J. R. BERRY 3,284,637

SEMICONDUCTOR CHOPPERS

Filed July 16, 1962 3 Sheets-Sheet 2

INVENTOR
JON R. BERRY

BY Stevens Davis Miller & Mosher

ATTORNEYS

INVENTOR
JON R. BERRY

BY Stevens, Davis, Miller & Mosher

ATTORNEYS 3,284,637
SEMICONDUCTOR CHOPPERS
Jon R. Berry, Lutherville, Md., assignor to Airpax Electronics Incorporated, Cambridge, Md., a corporation of Maryland
Filed July 16, 1962, Ser. No. 210,116
9 Claims. (Cl. 307—88.5)

The present invention relates to semiconductor choppers using high frequency techniques for connecting applied energy of one level to a useful energy of another level in response to the applied energy, and relates as well to a transistor chopper for closing a contact means such as a transistor pair for a length of time controlled by the length of time that a reference voltage is applied to a drive circuit or oscillator. More particularly, the invention is directed to a transistor chopper using a high frequency oscillator including a bifilarly wound transformer in which one conductive path of the bifilarly wound transformer is included in the transistor oscillator circuit.

In the new chopper circuit of the invention, the oscillator circuit may be turned on with a D.C. input which produces at the output terminals of the chopper an impedance change which effects a control on the load device. Although the chopper includes a transformer for relaying the applied power to the switching transistor, direct current may be conveniently applied to the chopper, and yet the chopper conveniently operates for switching power to a load.

The chopper of the invention may be used as a commutator or low level relay for the distribution of electrical energy.

Basically, the invention is useful in the application for relaying of energy or power to a load by switch means responsive to any control currents such as pulses, square wave type alternating currents, direct currents, or combinations thereof. Forms of the invention may be embodied in types of switch action known as SPST, SPDT, DPST, DPDT, and systematic arrangements including several of such types.

The invention includes a polarity sensitive input circuit, a transistor oscillator or modulator in which such oscillator is preferably of the Colpitts type and resonant at 1–10 mc., a ferrite transformer having a bifilar winding on a toroidal core element in which the ends of the winding forming the secondary are correspondingly energized with the adjacent ends of the winding of the primary, and rectifier-filter means to detect or convert the high frequency energy to a D.C. signal which is applied to the switching transistors which effects an impedance change to control the load device.

Therefore an object of the invention is to provide a chopper that will operate generally at any power frequency and D.C.

Also it is an object of the invention to reduce or eliminate noise by making the noise transmission very small through the circuit by use of the high frequency oscillator and the ferrite transformer.

Furthermore, it is an object of the invention to provide a chopper of small size and use high density packaging techniques available by the use of ferrite transformers over audio transformers and the high frequency techniques applied to the present novel circuit arrangement.

Another object of the invention is to provide an oscillator and transformer circuit tuned to one frequency only for use in a chopper which is responsive to any large range of frequencies and D.C.

It is another object of the invention to provide D.C. isolation between the input or drive end and the output or load end of the chopper even though the chopper is continuously operated.

It is an important object of the invention that a bifilar winding technique is used wound on a ferrite toroidal core, so that the transformer is tuned to one frequency, and the transformer does not incur the losses due to inductance leakage and capacity coupling normally inherent in small audio transformers used in chopper units, in which such losses result in much unwanted noise at the output of the chopper unit.

With the new arrangement it is possible to provide a transistor chopper having a single transistor oscillator for energizing the transformer, in which the drive circuit is used to produce the turn-on voltage for the transistor pair.

A complete understanding of the invention may be had from the following description of a particular embodiment of the invention. In the description, reference is made to the accompanying drawings of which:

Figure 1:
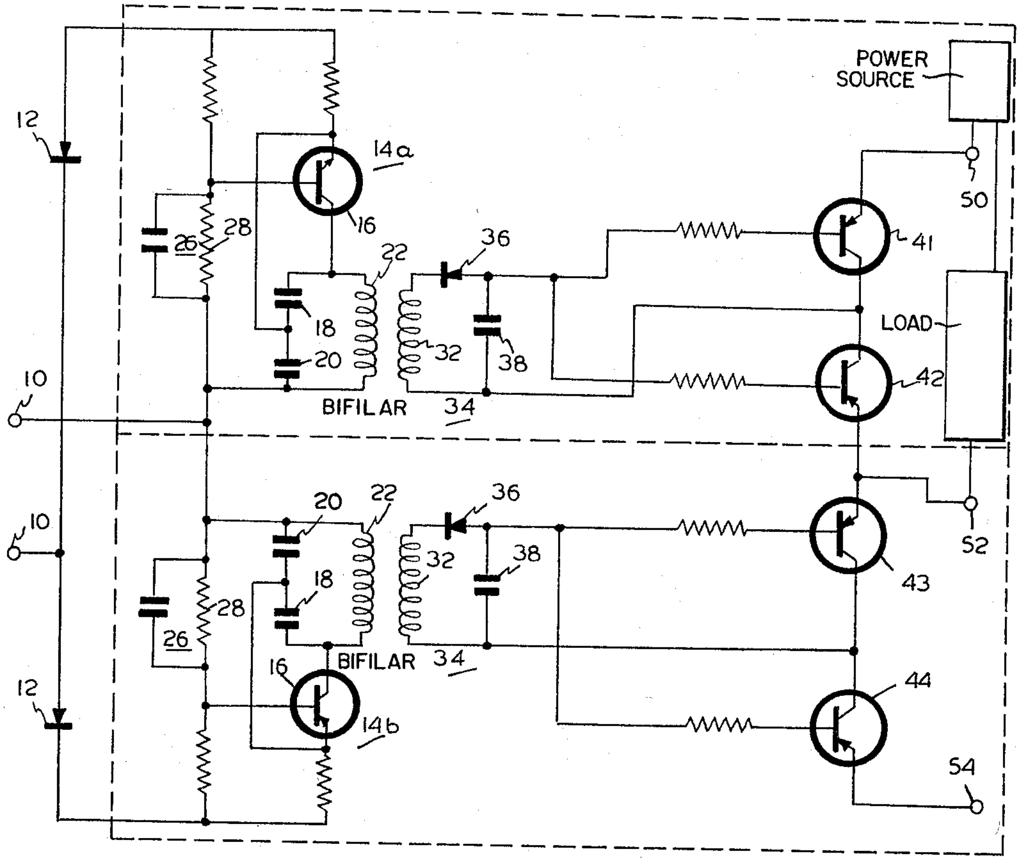
FIG. 1 is a schematic diagram of a chopper circuit embodying a preferred arrangement of the present invention.

Referring now to the drawings, square wave A.C. pulses, or D.C., may be applied to input terminals 10, 10. Conventional rectifier elements 12, 12 are arranged in circuit relation with the input terminals so that the signal applied at the terminals is applied to a drive or oscillator circuits 14*a*, 14*b*. Each oscillator circuit is preferably a Colpitts oscillator having a transistor 16, capacitors 18, 20, and a primary winding 22.

The energy applied to terminals 10, 10 completes a circuit through each bias network 26, and load resistor 28 so that the oscillator circuits 14*a*, 14*b* are driven into oscillation, generating a frequency of the tuned circuit 18, 20, 22. The oscillator circuits oscillate depending on the polarity of D.C. which is applied to terminals 10, 10.

From the windings 22, 22 a secondary current is derived in each of the windings 32, 32. Windings 22, 32 are bifilarly wound on a core in a manner such that adjacent ends of the bifilar windings are energized at a level different from the potential at the other adjacent ends of the bifilar windings.

The current is detected by the detector circuits 34, 34 formed by each of the rectifiers 36 and condensers 38.

The detected current is amplified in transistors 41, 42, 43, 44 which conduct in pairs to form a low impedance path between terminals 50, 52 and 52, 54, respectively. Transistors 41, 42 and 43, 44, respectively, function effectively as a single pole-single throw switch at terminals 50, 52 and 52, 54.

FIG. 1 illustrates a single pole-double throw (SPDT) switching system which essentially operates to change of impedance between terminals 50, 52 when oscillator circuit 14*a* oscillates, and changes of impedance between terminals 52, 54 when oscillator circuit 14*b* oscillates.

A load and a source have been shown schematically connected to the terminals 50 and 52 of FIG. 1. It should be understood that a similar arrangement of a source and load can be connected between any or all of the terminals of the outputs of each embodiment of the present invention. The source and load will not be shown in the other figures for the sake of clarity and in order to direct attention towards the inventive chopper.

Figure 3:
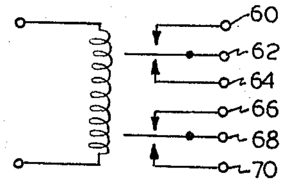
FIG. 3 is an equivalent circuit diagram of the chopper circuit shown in FIG. 2.
Figure 2:
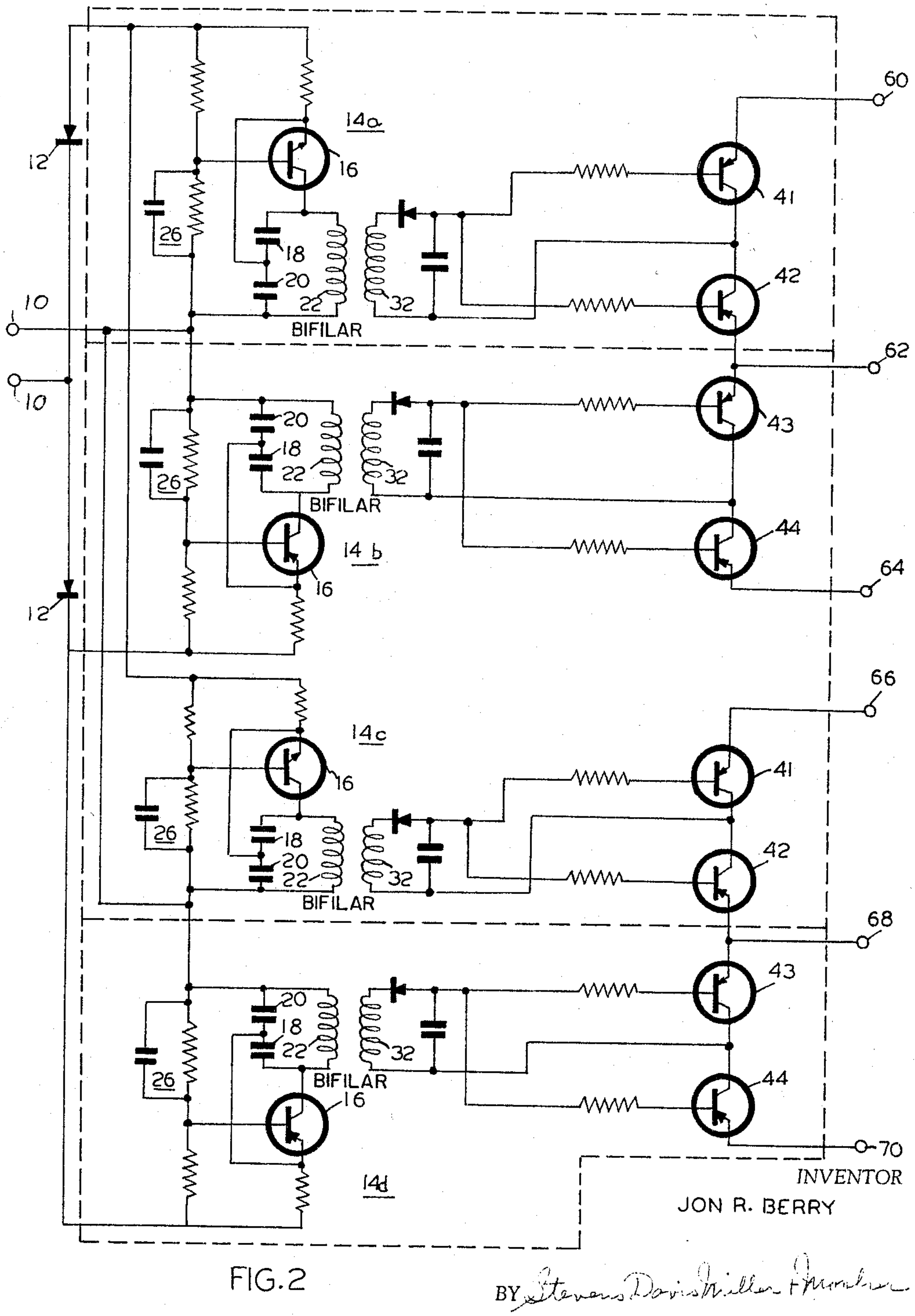
FIG. 2 is a schematic diagram of a DPDT type chopper circuit showing another embodiment of the invention.

A double pole-double throw (DPDT) switching system is shown in FIG. 2, and its equivalent circuit diagram is depicted in FIG. 3. By applying negative pulses, negative D.C., or negative square half cycles to terminals 10, 10, the oscillator circuits 14*a*, 14*c* respond into oscillation and a low impedance path is developed between terminals 60, 62 and 66, 68. Correspondingly, by applying oppositely poled currents to terminals 10, 10, the oscillator circuits 14*b*, 14*d* respond into oscillation as above described, and a low impedance path is developed between terminals 62, 64 and 68, 70.

It is noted that the DPDT arrangement of FIG. 2 is essentially two SPDT units of FIG. 1 in parallel arrangement. One embodiment of the invention provides that the negative half cycle turns the oscillator circuits ON, and the transistors used in these circuits 14*a*, 14*c* may be 2N706 types. Oscillator circuits 14*c* and 14*d* may use 2N721 types.

Figure 4:
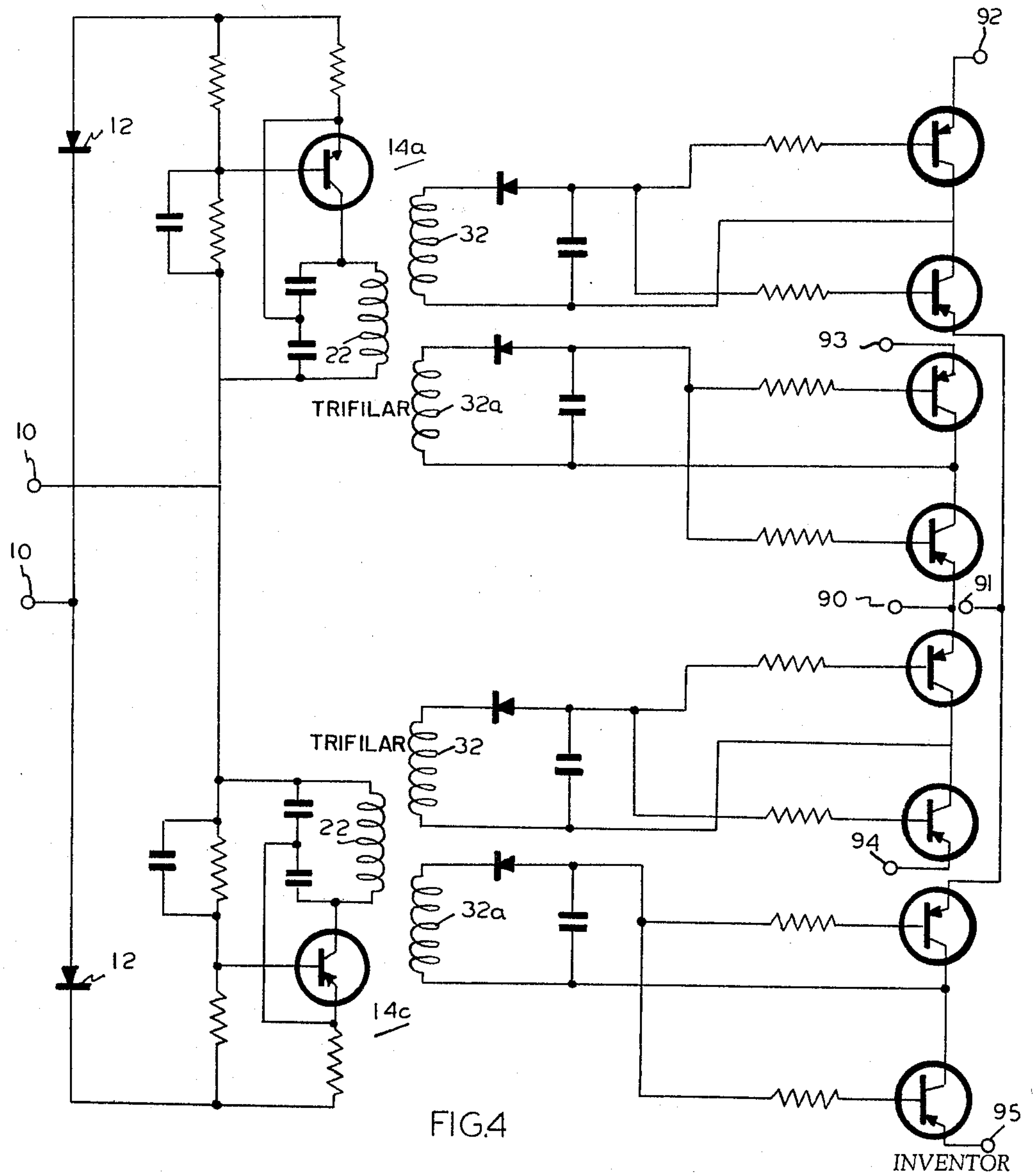
FIG. 4 is a schematic diagram of a DPDT type chopper showing another embodiment of the invention.

FIG. 4 illustrates a DPDT chopper which differs from the DPDT type shown in FIG. 2 by using only two oscillators instead of four. The ferrite toroidal transformer has one primary winding 22 and two secondary windings 32, 32*a* so that the winding turn ratio is 1:1:1. The windings 22, 32, 32*a* may be trifilarly wound which is defined as a conductor set involving the use of three wires or conductors in a common sheath or body of insulation to form the conductors of the set.

The switch transistors are coupled to similarly achieve a DPDT action in which impedance changes between terminals 92, 91, 95 and between 90, 93, and 94.

It has been found preferable to arrange the oscillator circuits shown so that the emitter circuit is triggered while keeping the collector circuit at A.C. ground. By this method the transistors tend to soften the leading edge of square wave pulses which may be applied to the terminals 10, 10 during turn ON time. The spike that is then fed through to the output of the transistor is considerably reduced by this arrangement.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A transistor chopper for applying a level of electrical energy to a load comprising input terminals connected for receiving and passing a current through a circuit between the input terminals, said circuit including a transistor oscillation circuit having a collecter connected to drive the oscillation circuit, said oscillation circuit having an inductance component, a substantial portion of the inductance component including one conductor of a bifilar winding and forming a primary, said bifilar winding being wound on a core for forming a transformer having a pair of conductors in a common insulation material and in which one conductor has generally a one-to-one turn ratio with the other conductor of the bifilar winding, said other conductor forming a secondary, a rectifier-filter network connected to said other conductor for producing a D.C. output, and semiconductor switch elements for passing a D.C. signal applied to an output terminal to said load.

2. A semiconductor SPDT switch for producing in one state of the switch an output when the switch is receiving energy of one polarity, and for producing in the other state of the switch an output when the switch is receiving energy of the other polarity, comprising a pair of polarity sensitive input devices, each connected to pass a current of a polarity opposite with respect to the other, a transistor oscillator operative in response to each of the polarity input devices, an oscillation circuit connected to be driven by said transistor oscillator, said oscillation circuit having an inductance component, a substantial portion of the inductance component including one conductor of a bifilar winding and forming a primary, said bifilar winding being wound on a core for forming a transformer having a pair of conductors in a common insulation material and in which one conductor has generally a one-to-one turn ratio with the other conductor of the bifilar winding, said other conductor forming a secondary, a rectifier-filter network connected to said other conductor for producing a D.C. signal, and semiconductor switch elements responsive to said D.C. signal for passing a current through said semiconductor switch to said load.

3. The invention of claim 2 in which said transistor oscillator is a Colpitts oscillator.

4. The invention of claim 2 in which the semiconductor switch elements alternatively are connected to produce said outputs when the respective polarity sensitive input device is passing current.

5. The invention of claim 2 in which said transistor oscillator includes a collector, and the emitter of the transistor is triggered while the collector circuit is at A.C. ground.

6. The invention of claim 2 in which the SPDT switch is connected with another semiconductor SPDT switch in parallel arrangement and thereby provides the DPDT switch.

7. A transistor chopper for switching electrical energy to a load comprising input terminals for receiving and passing a current through a circuit therebetween, said circuit including a transistor oscillation circuit having a collector connected to drive the oscillation circuit, said oscillation circuit having an inductance component, a substantial portion of the inductance component including one conductor of a trifilar winding and forming a primary, said trifilar winding being wound on a core for forming a transformer having a set of three conductors in a common insulation sheath and in which one conductor has generally a one-to-one-to-one turn ratio with the other conductors of the trifilar winding, said other conductors forming secondaries, a rectifier-filter network for producing a D.C. signal, connected to said other conductors and a semiconductor switch element responsive to each of said D.C. signals for passing a current through said semiconductor switch to said load.

8. A semiconductor DPDT switch for producing in one state of the switch an output current when the switch is receiving energy of one polarity, and for producing in the other state of the switch an output current when the switch is receiving energy of the other polarity, comprising a pair of polarity sensitive input devices, each connected to pass a current of a polarity opposite with respect to the other, a transistor oscillator operative in response to each of the polarity input devices, an oscillation circuit connected to be driven by said transistor oscillator, said oscillation circuit having an inductance component, a substantial portion of the inductance component including one conductor of a trifilar winding and forming a primary, said trifilar winding being wound on a core for forming a transformer having a set of three conductors in a common insulation sheath and in which one conductor has generally a one-to-one-to-one turn ratio with the other conductors of the trifilar windings, a rectifier-filler network said other conductors forming secondaries connected to said rectifier-filter network for producing a D.C. signal, and semiconductor switch elements forming poles and terminals of the DPDT switch for passing a current from one pole of the DPDT switch to one of the terminals of the DPDT switch.

9. The invention of claim 2 in which one side of said oscillation circuit is grounded.

UNITED STATES PATENTS

References Cited by the Examiner

| | | | |
|---|---|---|---|
| 2,591,792 | 4/1952 | Donley | 331—170 |
| 2,999,170 | 9/1961 | Tyler | 307—88.5 |
| 3,128,438 | 4/1964 | Suda | 321—16 X |
| 3,146,408 | 8/1964 | Nissim et al. | 332—14 X |
| 3,219,906 | 11/1965 | Keller et al. | 321—16 |

JOHN F. COUCH, *Primary Examiner.*

LLOYD McCOLLUM, *Examiner.*

J. M. THOMSON, W. E. RAY, *Assistant Examiners.*

UNITED STATES PATENT OFFICE
CERTIFICATE OF CORRECTION

Patent No. 3,284,637

November 8, 1966

Jon R. Berry

It is hereby certified that error appears in the above numbered patent requiring correction and that the said Letters Patent should read as corrected below.

Column 4, line 32, for "the" read -- a --; line 69, for "windings" read -- winding --; same line 69, for "filler" read -- filter --; line 70, after "network" insert a comma.

Signed and sealed this 12th day of September 1967.

(SEAL)
Attest:

ERNEST W. SWIDER
Attesting Officer

EDWARD J. BRENNER
Commissioner of Patents